Oct. 17, 1950     P. R. CARLSON     2,526,327
WINDSHIELD DEICER
Filed Sept. 25, 1944
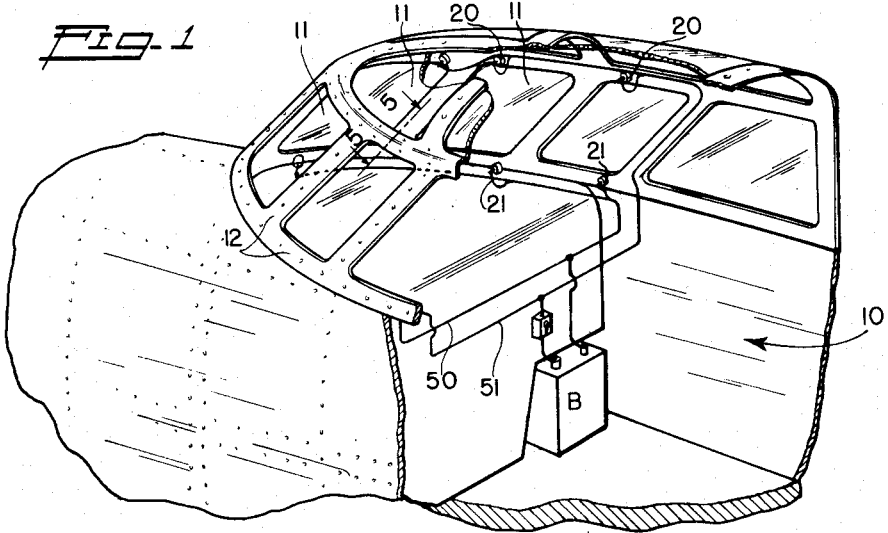
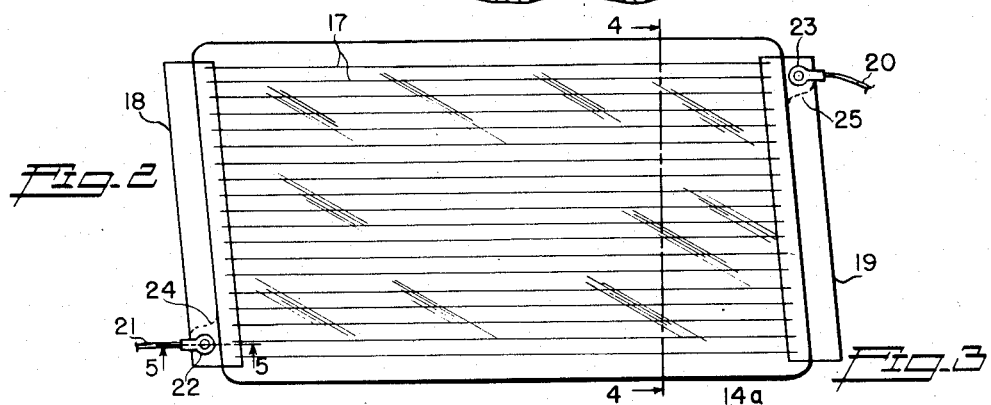
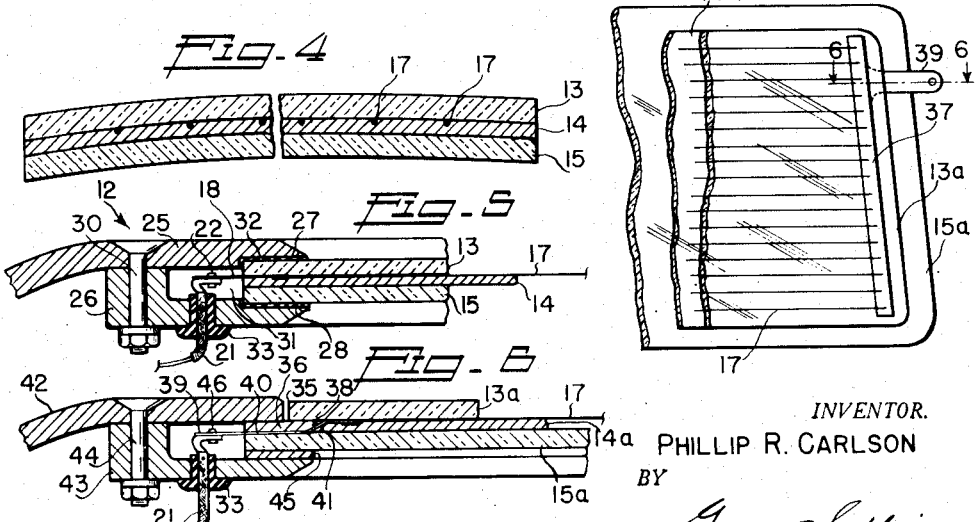
INVENTOR.
PHILLIP R. CARLSON
BY
George C. Sullivan
AGENT Patented Oct. 17, 1950

2,526,327

UNITED STATES PATENT OFFICE 2,526,327

WINDSHIELD DEICER

Phillip R. Carlson, Pasadena, Calif., assignor to Lockheed Aircraft Corporation, Burbank, Calif.

Application September 25, 1944, Serial No. 555,715

4 Claims. (Cl. 219—19)

This invention relates in general to de-icing of windows and windshields of vehicles and finds its most particular application to the pilot compartment windshields of airplanes which may be flown under weather conditions which are conducive to icing. More specifically the invention relates to a windshield or transparent panel of the laminated type in which electric heating elements are included in the laminations in such a manner as to distribute heat uniformly to the outer exposed lamination to be de-iced while restricting the inward flow of heat to the inner lamination.

Heretofore, various methods and means have been attempted to be employed to remove or prevent the formation of ice on the windshield of vehicles, such as airplanes, which are exposed to air in motion under icing conditions. For this purpose an attempt has been made to direct a blast of heated air onto the inside surface of the glass panel or to flow heated air through an intermediate space provided between a double glazed panel structure.

In both such methods a high temperature difference must be maintained between the inner and outer surfaces of the glass panel in order to effect sufficient heat transfer under icing conditions. By reason of such high heat gradient undesirably high inside surface glass temperatures must be maintained; in order to accomplish this the temperature of the air flowing in contact with the inside surface of the glass must necessarily also be high.

Power for the circulation of the heated air is also required and this together with the heat losses attendant upon such a method results in a de-icing method which is extremely inefficient and high in power requirements. In addition to the aforesaid lack of efficiency this method of heating transparent panels and windshields results in a relatively high inward radiation of heat which in the case of a vehicle such as an airplane is discomforting to the occupants who must face the transparent panel or windshield.

The mechanical scraper method is not reliable since it is found to be subject to frequent stalling in or the over-riding of the formed ice film and in time apt to scratch the panel surface over which it moves.

Electrical methods also have heretofore been employed for heating windshields wherein heating elements or wires are imbedded directly within the glass of the panel or threaded through an intermediate space between the inner and outer thicknesses of a double-glazed window structure. However, such means heretofore employed have not been found altogether satisfactory for the reason that such electrical elements or wires thus placed intermediate the two spaced layers of glass dissipated heat equally inwardly and outwardly through the panel and furthermore because provision was not made to provide adequate support and forceful contact of the heating elements with the inside surface of the outside lamination through which the heat was desired to be flowed. Other disadvantages which were found in the electrical heating means as heretofore employed was that the heating elements or wires were of such large dimensions as to seriously obstruct or annoyingly interfere with vision therethrough.

It is, therefore, an object of this invention to provide an improved windshield heating means which is free from the disadvantages inherent in those heretofore employed.

It is a further object of this invention to provide an apparatus for de-icing windshields and to provide a novel windshield incorporating heating means which is simple of construction, reliable and efficient in operation, and economical in utilization of power and free from convection and radiation heating effects within the windshield enclosure which are discomforting to the pilot or passengers facing the windshield or positioned adjacent thereto.

It is a still further object of this invention to provide an electrically heated transparent panel or windshield in which the heating elements do not constitute an obstruction to vision.

The invention resides broadly in a novel unitary transparent panel construction having a plurality of superimposed laminations through which heating elements are positioned in such a manner as to provide, with simple construction, a high rate of heat transfer such that heating elements of critically small dimensions, substantially invisible under normal conditions, may be used. This construction also provides for a directional transfer of a major portion of the heat dissipated within the panel by the heating elements, toward the outer surface of the windshield which is desired to be de-iced.

Advantages of this novel construction of the transparent panel and the methods of heating are that the heat is totally dissipated within the transparent panel and a major portion of the thus dissipated heat is caused to flow toward the surface which is exposed to icing conditions and only a minor portion of the dissipated heat is allowed to flow inward to the panel surface within the enclosure. This results in low glass temperature with low loss of heat to the interior of the windshield enclosure and consequently results in a higher efficiency in power utilization for the de-icing purposes as compared with the methods heretofore known and used.

Another advantage and feature of novelty of construction of the present transparent panel results from the discovery of the fact that exceedingly high rates of heat transfer may be obtained by intimate contact of the heating elements with the relatively high thermal conductivity exterior glass layer of which the panel is constructed. This high heat transfer coupled with the discovered fact that the dependence of the temperature of the heating element on the reciprocal of its radius is logarithmic while the dependence on the element spacing is linear makes it possible to choose an element spacing such that metallic wire heating elements may be employed which are extremely small, the smallness of such elements being practically limited at present, only by available methods of manufacture.

Other objects, advantages and features of novelty will be evident hereinafter.

In the drawings which illustrate a preferred embodiment of the invention and in which the same reference characters refer to the same or similar elements, Figure 1 is a fragmentary perspective view of the interior of an airplane pilot's compartment showing typical arrangements of windshield transparent panels and associated equipment.

Figure 2 is a plain view of a typical transparent panel such as that employed in the windshield of Figure 1.

Figure 3 is a fragmentary plain view of an alternative construction of the transparent panel.

Figure 4 is a cross-section of the transparent panel taken on line 4—4 of Figure 2.

Figure 5 is a cross-sectional detail of the panel and mounting frame as viewed from line 5—5 of Figure 1 and which corresponds to panel position 5—5 of Figure 2.

Figure 6 is a cross-sectional detail of an alternative construction of the panel and mounting frame as viewed from a position corresponding to line 5—5 of Figure 1 and line 6—6 of Figure 3.

In the drawings the de-icing power supply of the invention and typical windshield arrangement is illustrated as applied to the windshield of the pilot's compartment 10 of a typical airplane; although it may be similarly applied to windshields of other vehicles such as automobiles, locomotives, boats, and the like. The windshield panels 11 may be mounted in suitable mounting frames as shown at 12 in Figures 1, 5 and 6. These transparent panels are of the laminated construction employing a plurality of laminations bonded together in the manner of the so-called "safety-glass" or non-shatterable glass. A suitable panel construction is one employing three superimposed laminations, such laminations being shown at 13, 14 and 15 in Figures 4 and 5. The outer and inner laminations 13 and 15 respectively are preferably composed of a clear semi-tempered glass. An example of such glass suitable for this construction is Herculite semi-tempered plate glass manufactured by the Pittsburgh Plate Glass Company. Such semi-tempered glass is extremely resistant to shock and bending and will withstand high temperature differentials without cracking. The intermediate lamination 14 may be any one of the suitable transparent plastics employed in non-shatterable panes such as for example cellulose acetate or preferably a plasticized polyvinyl butyrate. "Flex-seal" a laminated safety-glass manufactured by the Pittsburgh Plate Glass Company employs such a polyvinyl butyrate intermediate bonding lamination and such construction and materials are well suited to use in connection with the present invention.

A plurality of heating elements or resistance wires 17, preferably arranged parallel to one another and uniformly spaced across the width of the panel as shown in Figure 2 are retained at the inter-face between the inner surface of the outer glass lamination 13 and the contacting surface of the inner plastic lamination 14 as best shown in enlarged cross-section in Figure 4. The heating elements 17 which are shown in exaggerated diameters for convenience of illustration are retained in contact with the inner surface of the glass lamination 13 by the softer plastic material of the said lamination 14 into which they are depressed in the assembling process. A pair of bonding strips or conductor busses 18 and 19 are provided at either end of the transparent panel to which the opposite ends of the parallel heating elements 17 are bonded or attached in suitable fashion whereby all of such heating elements 17 are bonded or attached in suitable fashion whereby all of such heating elements 17 are electrically connected in parallel and may be supplied with a suitable heating current. The bonding strips or busses 18 and 19 are preferably made of a thin metallic conductor such as a copper foil material which is relatively thin and which may extend into the transparent panel at the inter-face between the glass 13 and the lamination 14 as best shown in Figures 2 and 5, and extend out from the edge thereof to provide an exposed area to which conductors 20 and 21 may make electrical connection by suitable means such as by soldering or bolting as shown at 22 and 23 in Figure 2 and at 22 in Figure 5.

After determination of the desired point of connection for the electrical conductors 20 and 21 at opposite points such as at 22 and 23 shown in Figure 2, the balance of the exposed bus strip extending from the edge of the panel may, if desired for convenience of installation, be trimmed as shown in dotted lines at 24 and 25 to form two terminal tabs.

The resistance wires 17 may be electrically bonded at their ends to the terminal strips or busses 18 and 19 in any suitable manner such as by folding through small perforations or by resistance welding, soldering, or similar means.

The lead wires 20 and 21 may be connected to any suitable source of electric current such as a generator or battery as diagrammatically illustrated at B in Figure 1. Conductors 50 and 51 serve to interconnect the several panel leads in parallel with the current source B.

Referring now primarily to Figure 5, the transparent panel composed of the glass layers 13 and 15 bonded together by an intermediate plastic lamination 14 as hereinbefore described, may be mounted in a non-flush type of frame having, for example, in the case of an airplane installation, an outer skin surface 25 and an inner retaining frame member 26, said outer and inner members being adapted to be clamped about the edge of the transparent panel as shown at 27 and 28 by means of a plurality of spaced clamping bolts as shown at 30. The inner retaining frame 26 is formed as best shown in Figure 5, to provide an inner recess or cavity 31 sealed from the weather by means of a gasket 32 into which the bonding strip 18 or the bonding tab 24 may extend. An insulated bushing 33 making a pressed fit through a suitable opening in the clamping frame 26 provides for the entrance into cavity 31 of the conductor 21 which in turn makes electrical contact at 22 with the bonding strip 18—24.

Referring now primarily to Figures 3 and 6 an alternative construction of the transparent panel and frame is illustrated which is more particularly adapted to a flush mounting arrangement than those heretofore shown and described in connection with Figures 2 and 5. The outer and inner glass layers 13a and 15a respectively are bonded together by means of an intermediate plastic layer 14a which, as hereinbefore stated, may preferably be a suitable plastic such as a plasticized polyvinal butyrate. In this alternative construction instead of forming all of the three superimposed laminations of the same overall dimensions as shown in Figures 2 and 5 whereby all of the edges are congruous, in the alternative arrangement as shown in Figures 3 and 6 the outer glass layer is of reduced area to provide a step or shoulder 35 and to expose a marginal strip of the intermediate plastic lamination as shown at 36. The resistance wires 17 are in a parallel, spaced arrangement at the interface between the glass and plastic layer in the manner heretofore described in connection with Figures 2 and 5 but instead of the wires being connected at their ends to a terminal strip or conductor bus which extends from the end of the transparent panel, the said resistance wires 17 terminate at their opposite ends in a pair of terminal strips as shown at 37 which extend parallel with the ends of the transparent panel, but are spaced inwardly therefrom a suitable distance in order to form weather-tight seals as shown at 38, between the terminal strips 37 and the exposed edge or shoulder of the outer glass 13a. Terminal tabs as shown at 39 formed integral with or suitably attached to the terminal strips 37 are brought out from the edge of the transparent panel at a point intermediate the plastic lamination and the inner surface of the inner glass layer as best shown at 40. With this arrangement the terminal tabs 39 are led to the interface between the plastic lamination 14a and the inner surface of the inner glass layer 15a through a diagonal slot 41 formed in the plastic lamination.

The stepped marginal portion of the transparent panel is adapted to be clamped between the outer frame member 42 and an inner clamping frame 43 by means of a plurality of peripherally spaced bolts, one of which is shown at 44. The outer frame member 42 bears upon the outer surface of the exposed marginal portion of the intermediate plastic lamination 14a as shown at 36 and the inner clamping frame 43 bears upon the corresponding inner marginal portion of the glass layer 15a through an intermediate gasket 45. It is apparent from this construction that the outer frame 42 may be made flush with the outer surface of the glass layer 13a and at the same time the terminal strips 37 and the associated terminal tabs 39 may be brought out in such a manner as to be protected from electrical contact with the outer frame member at point 36 and at the same time protected from exposure to the weather, water, dirt, and the like substances which may enter the recess at 35 formed between the edge of the glass 13a and the inner edge of the adjacent frame member 42.

The electrical conductor 21 may, as hereinbefore described in connection with Figure 5, pass through a bushing 33 in the inner mounting frame 43 and make suitable connection at 46 with the enclosed end of the terminal tab 39.

As in the case with the construction shown and described in connection with Figure 2 the resistance wires 17 may be electrically bonded at their opposite ends to the terminal strips by any suitable means such as folding through perforations, folding around the terminal strip, resistance welding, soldering, and the like.

Heretofore, in attempts to utilize heating elements in transparent panels it was commonly believed necessary to employ relatively large resistance wires in the order of 0.01 cm. to $\frac{1}{16}''$ in diameter with spacings varying from 2 mm. to approximately 0.5 inch. It was thought that such relatively large resistance wire heating elements were necessary in order to avoid high local temperatures at their surfaces. It has been discovered however that provided intimate contact is maintained with the outer glass of a plastic laminated panel and that the heat flow may be confined to that toward the outside layer to be de-iced, and provided the wire spacing is appropriately chosen, such large size heating elements need not be employed and that in the ranges of heating and power required for satisfactory de-icing of windshields there is no limitation to the smallness of the diameter and fineness of the resistance wire which may be employed for heating the transparent panel except the physical limitation of the present state of the art of its manufacture. It has accordingly been discovered and it is a particular feature of this invention, as hereinafter more fully described, that the resistance wires or elements which may be employed in the transparent panel of the type shown and described herein need not be larger than approximately $.0005''$ in diameter and that smaller diameters may be employed if obtainable. The heating element wire diameters heretofore employed for heating transparent panels have been approximately fifty times greater than those which have been discovered to be operative in accordance with this invention. Such large sized wires were so objectionable from a visual standpoint as to be practically prohibitive. The heating element wire size which applicant has discovered may be employed in heating the transparent panel on the other hand is so small as to be substantially invisible under all ordinary conditions.

The applicant has also found that it is advantageous to place the heating element wires at the inter-face between the inner surface of the outer glass sheet and the outer surface of the intermediate plastic lamination, in order to direct the major portion of the dissipated heat outwardly toward the outer surface of the outer glass layer which it is desired to de-ice. This feature materially contributes to the practical use of such small size heating wires. The heating element may be composed of substantially any conductive metal dependent upon the total resistance and voltage under which the apparatus is desired to be operated.

Applicant's discovery leading to the transparent panel construction of this invention includes the derivation of the relationship of the heating wire diameter and spacing for transparent panels under the various conditions obtaining in its design and operating environment such as panel element arrangement and thickness of material, wire temperature, surface film heat exchange coefficients, etc. may be closely approximated by the following expression:

(1)
$$Tw-Ta=\frac{RL}{2\pi(K_p+K_g)}\cdot\log\left[1+\frac{\left(d+\frac{K_g}{F}\right)^2}{r^2}\right]$$

$d$ = thickness of the exterior glass layer (cm.)
$K_g$ = thermal conductivity of the exterior glass layer (cal./cm.²/sec./C.°/cm.)
$R$ = heat loss from the exterior glass layer (cal./cm.²/sec.)
$F$ = surface film coefficient for exterior glass layer (cal./cm.²/sec./C.°)
$Ta$ = outside air temperature of the exterior glass layer (°C.)
$K_p$ = thermal conductivity of intermediate plastic lamination (cal./cm.²/sec./C.°/cm.)
$r$ = radius of heating wire (cm.)
$Tw$ = temperature of heating wire (C.°)
$L$ = spacing of heating wire (cm.)

The de-icing heat requirements for the most frequent icing conditions encountered and for which the foregoing formula is applicable are based on the findings reported in the N.A.C.A. Report R.B. No. 3F24.

Applicant has further discovered the relationship between the maximum and minimum temperature of the exposed glass panel layer in terms of heating wire spacing and the various physical and dimensional constants of the laminated panel to be closely approximated by the following formula where $T_1-T_2$ is the maximum and minimum temperature difference.

(2)
$$T_1-T_2=\frac{RL}{2\pi K_g(K_p+K_g)}\left[K_p\sum_{n=-N}^{+N}\log\left\{1+\frac{4\frac{K_g}{F}\left(d+\frac{K_g}{F}\right)}{n^2L^2+d^2}\right\}\right.$$
$$\left.-K_p\sum_{n=-N}^{+N}\log\left\{1+\frac{4\frac{K_g}{F}\left(d+\frac{K_g}{F}\right)}{\left(n+\frac{1}{2}\right)^2L^2+d^2}\right\}+(K_g-K_p)\sum_{n=-N}^{+N}\log\left\{1+\frac{\frac{1}{4}+n}{n^2+\frac{d^2}{L^2}}\right\}\right]$$

The symbols employed in the above Formula 2 expressing the maximum non-uniformity of exposed glass surface temperature are of the same meanings and values as the same ones employed hereinbefore in connection with the wire temperature Formula 1. The number of wires in the panel is equal to 2N−1.

The values of R and F will vary only slightly for forwardly located, sloping windshields in different airplanes of the type having air speeds in the neighborhood of 150 to 250 miles per hour. Under such conditions a suitable value for R has been found to be approximately 0.075 calory per square cm. per second and F has been found to be approximately 0.0038 calory per square cm. per second per degree C.

For conditions encountered by automobiles suitable values of R and F appear to be approximately .020 and .0013 respectively.

Suitable values for $K_g$ and $K_p$ for most all glasses and plastic laminations under all practical conditions and uses are .0025 calory per cm.² per second per degree C./per cm. and .0005 calory per cm.² per second per degree C./per cm. respectively.

All of the above enumerated constants and the formula are valid for heating wires smaller than approximately 0.1 mm. in diameter, an intermediate plastic thickness in the order of ten times the wire diameter or greater. In the panel construction of the type illustrated the effect of the inner glass layer may be neglected since in the presence of the intermediate plastic lamination of relatively low heat conductivity its effect on the heat flow pattern and heat loss is negligible.

The value of R and K hereinbefore mentioned correspond to average suitable values.

By way of example a three-ply transparent panel 23 inches long and arranged as illustrated in Figure 4 was constructed having an outer and inner semi-tempered plate glass layer $\frac{3}{16}''$ thick with an intermediate plasticized, polyvinal butyrate plastic lamination $\frac{1}{8}''$ thick. Advance heating wires 0.001 inch in diameter spaced 0.6 inch apart and running lengthwise of the panel were placed at the inter-face between the inner surface of the outer glass layer and the outer surface of the plastic lamination as illustrated in enlarged section in Figure 4. The panel was 14 inches wide and contained 21 of such heating wires.

Under typical de-icing conditions the wire temperature was found to remain at approximately 95° or 170° F. above the external air temperatures at all times or approximately 75° to 100° C. The temperature difference between the exposed exterior surface directly opposite the heating wire and that midway between the locations of two wires was found to be approximately 6° F. These values checked closely with that predicted by Formulae 1 and 2 hereinbefore mentioned. Approximately five amperes at 115 volts was utilized in the 21 heating wires connected in parallel as illustrated.

For an exterior glass thickness of ¼ inch an increased wire spacing to 0.8 inch was found to be permissible.

The foregoing is merely illustrative of the preferred embodiments of the invention and is not to be considered limiting. Modifications may be made by those skilled in the art and the invention is to be understood to include any method and apparatus which accomplishes the objects of the invention within the scope of the appended claims.

I claim:

1. A transparent panel comprising superimposed inner and outer layers of glass bonded together by an intermediate layer of plastic characterized by a substantially lower heat conductivity than that of glass, a plurality of parallel spaced wires retained at the inner face between said outer glass layer and said intermediate plastic layer and of such small diameter as to be substantially invisible under normal conditions, said wires being thus retained in contact with the inner surface of said outer glass layer but separated and insulated from the inner surface of said inner glass layer by said plastic, whereby heat released from said wires will flow more readily to the outside glass layer than to said inner glass layer, a conductor bus intermediate said outer glass layer and said plastic layer adjacent to and extending from the edge of said panel to which said wires make parallel electrical contact and means to apply an electric heating current to said conductor bus.

2. A transparent panel comprising superimposed inner and outer layers of glass bonded together by an intermediate layer of plastic characterized by a substantially lower heat conductivity than that of glass, a plurality of parallel spaced wires having diameters of approximately .001 inch and retained at the inner face between said outer glass layer and said intermediate plastic layer, said wires being thus retained in contact with the inner surface of said outer glass layer but separated and insulated from the inner surface of said inner glass layer by said plastic whereby heat released from said wires will flow more readily to the outside glass layer than to said inner glass layer, and means to apply an electric heating current to said wires.

3. A transparent panel comprising superimposed inner and outer layers of glass bonded together by an intermediate layer of plastic characterized by a substantially lower heat conductivity than that of glass, a plurality of parallel spaced wires having diameters of approximately .001 inch and spaced approximately 0.5 inch apart, and retained at the inner face between said outer glass layer and said intermediate plastic layer, said wires being thus retained in contact with the inner surface of said outer glass layer but separated and insulated from the inner surface of said inner glass layer by said plastic whereby heat released from said wires will flow more readily to the outside glass layer than to said inner glass layer, and means to apply an electric current to said wires.

4. A transparent panel in accordance with claim 3 in which the intermediate plastic is polyvinal butyrate.

PHILLIP R. CARLSON.

REFERENCES CITED

The following references are of record in the file of this patent:

UNITED STATES PATENTS

| Number | Name | Date |
|---|---|---|
| 1,757,769 | Halbig | May 6, 1930 |
| 2,189,465 | Haley et al. | Feb. 6, 1940 |
| 2,222,742 | Ducret et al. | Nov. 26, 1940 |